United States Patent
Wortman et al.

(10) Patent No.: US 11,447,304 B2
(45) Date of Patent: Sep. 20, 2022

(54) BUCKET LID WITH UNDERSWIVEL

(71) Applicant: BUCKET BROTHERS LLC, Mansfield, OH (US)

(72) Inventors: Ivan J. Wortman, St. Marys, PA (US); Tyler Seymour, Beavercreek, OH (US); Mitchell W. Cox, Newark, OH (US)

(73) Assignee: BUCKET BROTHERS LLC, Mansfield, OH (US)

( * ) Notice: Subject to any disclaimer, the term of this patent is extended or adjusted under 35 U.S.C. 154(b) by 0 days.

(21) Appl. No.: 17/177,598

(22) Filed: Feb. 17, 2021

(65) Prior Publication Data

US 2021/0188492 A1 Jun. 24, 2021

Related U.S. Application Data

(63) Continuation-in-part of application No. 16/207,510, filed on Dec. 3, 2018, now Pat. No. 10,947,017.

(60) Provisional application No. 62/593,438, filed on Dec. 1, 2017.

(51) Int. Cl.
| | |
|---|---|
| *B65D 43/02* | (2006.01) |
| *B65D 43/16* | (2006.01) |
| *A47C 7/62* | (2006.01) |
| *B65D 51/24* | (2006.01) |

(52) U.S. Cl.
CPC ............ *B65D 43/161* (2013.01); *A47C 7/628* (2018.08); *B65D 51/24* (2013.01)

(58) Field of Classification Search
CPC ............ B65D 2251/10; B65D 2251/06; B65D 2251/0003; B65D 2251/24; B65D 43/0218; B65D 43/065; B65D 43/0208; A47C 7/02; A47C 7/626

USPC .................... 220/212; 206/315.11; 43/56
See application file for complete search history.

(56) References Cited

U.S. PATENT DOCUMENTS

| | | |
|---|---|---|
| D980,097 | 12/1910 | Grant |
| 2,346,744 A | 4/1944 | Glassman |
| 3,206,266 A | 9/1965 | Holloway et al. |
| 3,603,019 A | 9/1971 | Smeltzer |
| 3,746,391 A | 7/1973 | Novak |

(Continued)

OTHER PUBLICATIONS

H.T. Enterprises "HT Bucket Seat" https://www.amazon.com/H-T-Enterprises%C2%AE-Padded-Bucket-Seat/dp/B0002N26HA; A padded bucket seat that's crescent shaped to access the contents of the bucket.

(Continued)

*Primary Examiner* — King M Chu
(74) *Attorney, Agent, or Firm* — Jacob M. Ward; Ward Law Office LLC (57) ABSTRACT

A combination bucket lid and seat permits a user to access contents of the bucket while the user is seated. The lid has a lip for engaging the bucket, and an opening configured to receive a hand of a user for removing the bucket contents. The opening is selectively covered by a door that is attached to the lid. The door is movable between a closed position and an opened position. The door is configured to cover the opening of the lid in the closed position and uncover the opening of the lid in the open position. The main body has a pad that allows the user to be comfortable while sitting atop the combination bucket lid. More specifically, the door may be attached to the lid by a hinge, or rotatable about an axis of rotation, to selectively cover and uncover the opening.

15 Claims, 9 Drawing Sheets

(56) References Cited

U.S. PATENT DOCUMENTS

| | | | |
|---|---|---|---|
| 3,751,845 A * | 8/1973 | van Leeuwen | A01K 97/06 |
| | | | 43/56 |
| 5,429,265 A | 7/1995 | Maire et al. | |
| 5,586,805 A | 12/1996 | Rinehart | |
| D391,717 S | 3/1998 | Stein | |
| 5,970,651 A | 10/1999 | Torkilsen et al. | |
| D439,022 S | 3/2001 | Brandeis | |
| 9,809,376 B2 | 11/2017 | Mitchell et al. | |
| 2004/0074936 A1 | 4/2004 | McDonald | |

OTHER PUBLICATIONS

FRABILL "FRABILL Strato Bucket Seat" https://www.amazon.com/Frabill-1642-Strato-Bucket-Seat/dp/B0002N2FD0/ref=sr_1_fkmrnull_1?keywords=Frabill+Strato+Bucket+Seat&qid=1551716166&s=gateway&sr=8-1-fkmrnull; A padded bucket seat that's has a rounded edge, to allow a user to access the contents of the bucket. Champion Sports "Champion Sports Ball Bucket" https://www.amazon.com/Champion-Sports-Plastic-Ball-Bucket/dp/B0029VNJ7E/ref=sr_1_3?ie=UTF8&qid=1510435330&sr=8-3&keywords=baseball+bucket+with+padded+lid; Bucket lid with padding for a user to sit on.

\* cited by examiner

BUCKET LID WITH UNDERSWIVEL

CROSS REFERENCE TO RELATED APPLICATIONS

This application is a continuation-in-part of U.S. patent application Ser. No. 16/207,510, filed Dec. 3, 2018, which in turn claims the benefit of U.S. Provisional Application No. 62/593,438, filed on Dec. 1, 2017, the entire disclosures of which are incorporated herein by reference.

FIELD

The present disclosure generally relates to a combination seat and lid and, more particularly, to a combination seat and lid for placement on a bucket.

INTRODUCTION

This section provides background information related to the present disclosure which is not necessarily prior art.

Buckets are commonly used for recreational purposes. For example, athletes, gardeners, fisherman, hunters, and campers commonly use buckets to carry items such as baseballs, spades and planters, bait and fishing tackle, bullets, and food.

Conventional buckets may be five-gallons or six-gallons in volume, and approximately two-feet tall and one-foot in diameter. These buckets are also generally made of plastic and may be provided with an inexpensive wire or plastic handle that pivotally attaches across a top of the bucket. Such buckets can also be provided with molded plastic lids that may be selectively snapped on top of the bucket to seal the bucket and secure the contents.

It is known to use these conventional bucket lids as a seat. For example, in baseball, an athlete or coach will often sit on a baseball bucket in the dugout. A gardener may also sit upon the bucket as he or she plants bulbs or pulls weeds. However, there are problems with using conventional bucket lids as a seat. Often, the bucket lid is not padded, and may become uncomfortable to sit on after extended periods of time. Additionally, a person sitting on the bucket lid may not be able to access the contents without standing and removing the lid.

Bucket lids that have a cushion are known in the art. For example, U.S. Pat. No. D439,022 to Brandeis discloses a cushioned bucket lid that has a hinged door and an integral storage area. The Brandeis lid allows a user to open the door and access a storage area of the lid but not an underlying bucket with which the lid is used. In a further example, U.S. Pat. No. 3,751,845 to van Leeuwen, discloses a fishing bucket with a rotatably mounted closure and seat means. The van Leeuwen fishing bucket provides access an integral storage area of the closure and seat means but not access to the underlying bucket while the person is seated.

There is a continuing need for a bucket lid and seat combination that allows a user to access the contents of the bucket while in a seated position. Desirably, the bucket lid and seat combination is padded for the comfort of the user while in the seated position.

SUMMARY

In concordance with the instant disclosure, a bucket lid and seat combination that allows a user to access the contents of the bucket while in a seated position, and which is padded for the comfort of the user while in the seat position, has been surprisingly discovered.

In a first embodiment, a combination seat and bucket lid has a main body with an opening formed therein. A door is selectively attached to the main body. The door has a first pad. The door is movable between an opened position and a closed position. The door covers the opening where the door is in the closed position. The door is disposed between the first pad and the main body where the door is in the opened position.

In another embodiment, a combination seat and bucket lid has a main body with an opening formed therein. A door is hingedly attached to the main body. The door has a first side and a second side. Attached to the first side of the door is a first pad. The door is selectively movable between an opened position and a closed position. The door covers the opening of the main body in the closed position. The first pad is disposed within the opening, where the door is in the closed position. The door is disposed between the first pad and the main body where the door is in the opened position.

In a further embodiment, a combination seat and bucket lid has a main body with an opening formed therein. A door is movably attached to the main body and selectively rotatable about an axis of rotation that is transverse to the main body. The door has a first side and a second side. A first pad is disposed on the second side of the door. The door is movable between an opened position and a closed position. The door covers the opening of the main body in the closed position, and the first pad is not disposed within the opening where the door is in the closed position. The door is disposed between the first pad and the main body where the door is in the opened position and in the closed position. The door is also disposed entirely within the lip of the lid where the door is in the closed position. However, a portion of the door is disposed outside of the lip where the door is in the opened position.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become clear to those skilled in the art from the following detailed description, particularly when considered in the light of the drawings described hereafter.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-22 show various embodiments of a combination seat and bucket lid 2 according to the present disclosure. The bucket lid 2 permits a user 3 to access contents of a bucket 4 while seated, for example, as shown in FIG. 16. Although the lid 2 is illustrated herein as being attachable to a conventional five-or-six-gallon bucket 4, it should be appreciated that the lid 2 may also be configured to attach to any other suitable container, such as a tote, a cup, a box, etc., as desired.

With continued reference to FIGS. 1-22, the lid 2 may have a main body 6 with a lip 8. The lip 8 may be configured to receive or otherwise connect with a top of the bucket 4. The lip 8 surrounds the main body 6 of the lid 2 and defines an outermost perimeter 10 of the main body 6. Within the perimeter 10 of the main body 6 is a center area 12. An opening 14 is formed in the center area 12 of the main body 6.

A door 16 is moveably attached to the main body 6 and configured to selectively seal and unseal the opening 14. In particular embodiments, the door 16 may be attached to the center area 12 of the main body 6. The door 16 may be movable between an opened position 18 (shown in FIGS. 4, 7-8, 10-11, 13-14, 16, and 18-22) and a closed position 20 (shown in FIGS. 1-3, 5, 9, 12, and 17).

In the closed position 20, the door 16 is adapted to cover the opening 14 formed through the main body 6, and to protect the contents of the bucket 4 from the surrounding environment. In the opened position 18, the door 16 is configured to permit access to the contents of the bucket 4 by a user 3 reaching through the opening 14 while the user 3 is in a seated position, for example, as shown in FIG. 16. As used herein, and unless otherwise stated, the term "opened position 18" is defined as including both fully opened and partly opened positions 18 of the door 16, and the term "closed position 20" is defined to be the fully closed position 20 of the door 16.

As non-limiting examples, the bucket lid 2 and the associated door 16 may be formed from a suitable thermoplastic such as polypropylene or polyethylene, or a suitable metal such as aluminum or steel. It is contemplated that the bucket lid 2 and the door 16 may also be formed from wood or composite materials in certain examples. However, one of ordinary skill in the art may also select other suitable materials for the bucket lid 2 and door 16, within the scope of the present disclosure.

Advantageously, as shown in FIGS. 2-3, 4, 7-8, and 10-14, the door 16 may have a first pad 22 affixed to the door 16 to support and provide comfort to the user 3 while in the seated position. The first pad 22 may have a suitable thickness that facilitates a cushioning of the user 3 when seated, for example, between about one tenth of an inch (1/10") and about one inch (1") in thickness. Other suitable thicknesses for the first pad 22 may also be selected by one of ordinary skill in the art.

As non-limiting examples, the first pad 22 may be formed from foam or sponge rubber material such as polyurethane or a polyester fiber. The material selected for the first pad 22 may provide both comfort and be resilient to minimize degradation with exposure to the environment. The first pad 22 may also be affixed to the door 16 with a thin adhesion layer 18 of a chemical adhesive, for example, an acrylic adhesive. The adhesion layer 18 may be provided as a full layer between the door 16 and the first pad 22, or by a matrix or pattern of adhesive beads between the door 16 and the first pad 22. Mechanical fastening means for affixing the first pad 22 to the door 16 are also contemplated. However, a skilled artisan may select any other suitable material for the adhesion layer 18 and the first pad 22, or other means for affixing the first pad 22 to the door 16, as desired.

Figure 4:
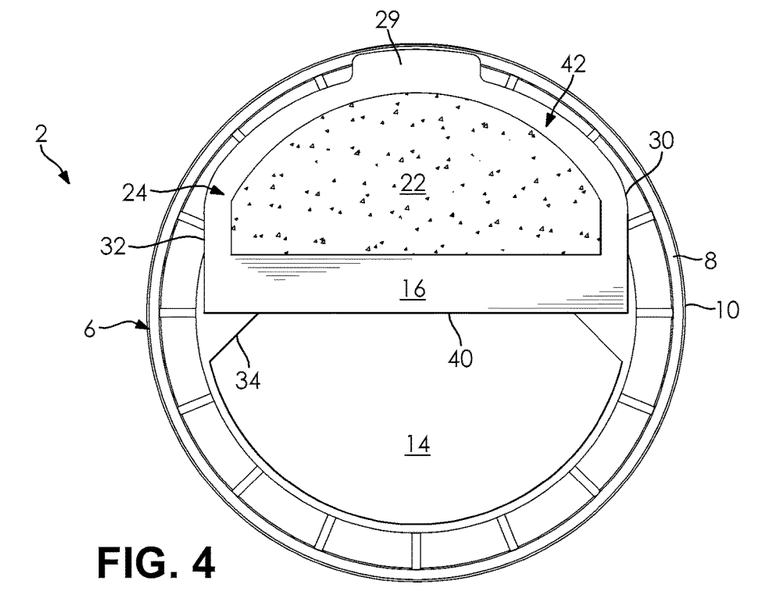
FIG. 4 is a top plan view of the lid shown in FIG. 1 with the door shown in an opened position and not covering the opening of the lid.
Figure 8:
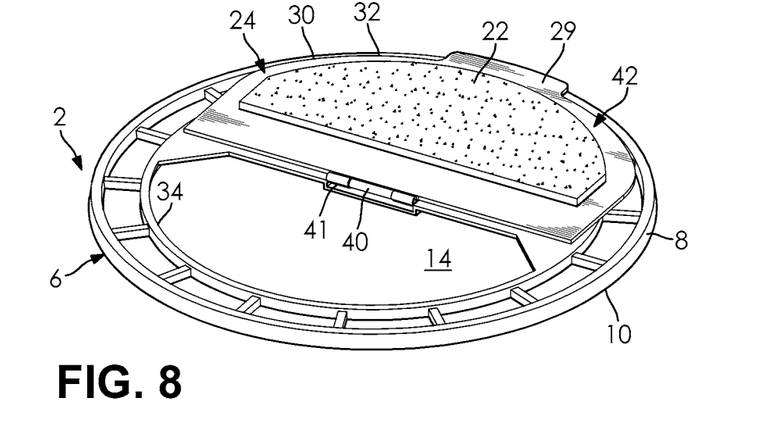
FIG. 8 is a top perspective view of the lid shown in FIGS. 5 and 7, where the door is illustrated in the fully opened position.
Figure 9:
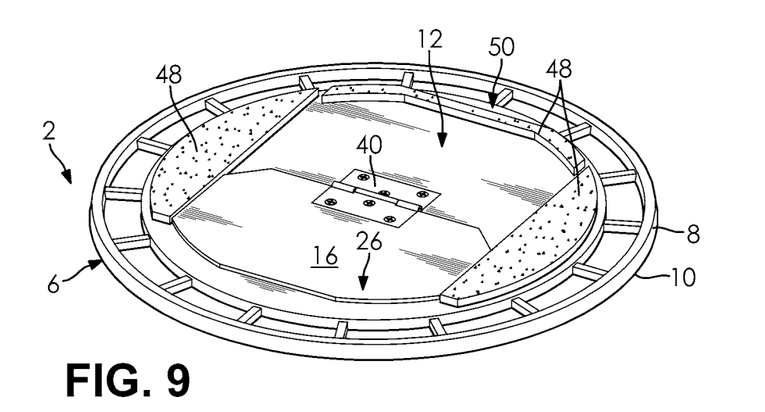
FIG. 9 is a top perspective view of a lid according to a further embodiment of the present disclosure, and further showing a movable door in a closed position and covering an opening of the lid.
Figure 10:
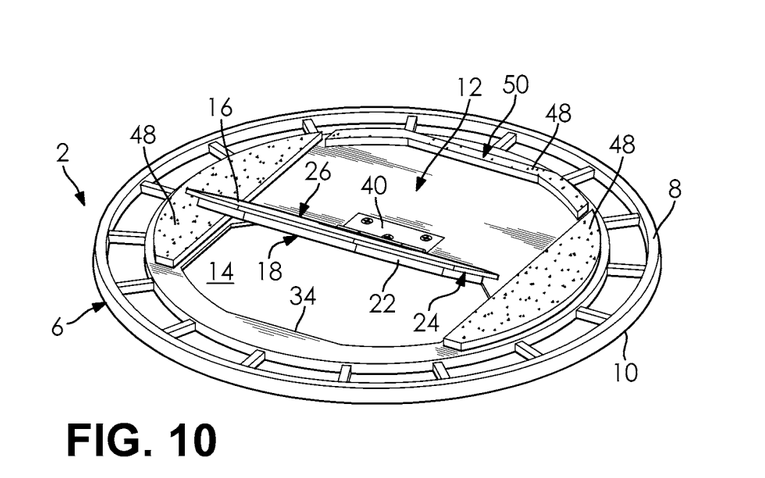
FIG. 10 is a top perspective view of the lid shown in FIG. 9, where the door is illustrated elevated between the opened position and the closed position.
Figure 11:
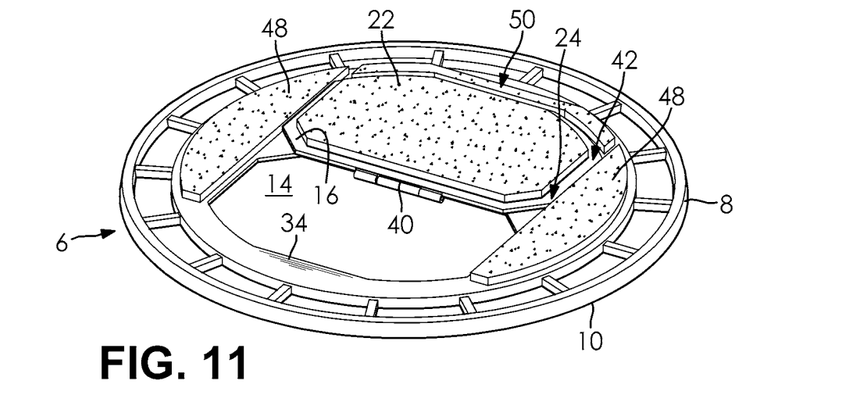
FIG. 11 is a top perspective view of the lid shown in FIGS. 9 and 10, where the door is illustrated in the fully open position.
Figure 14:
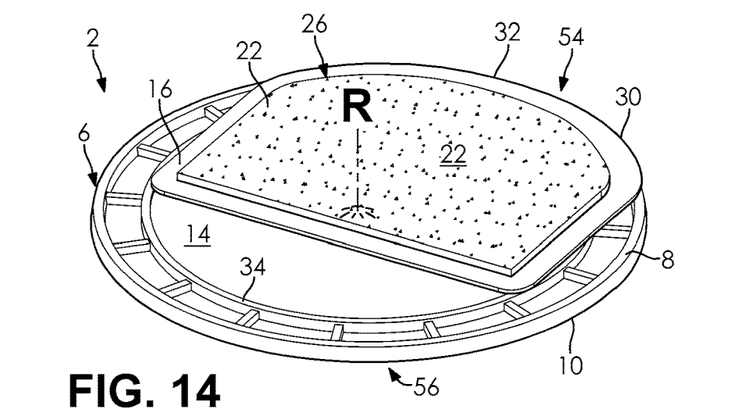
FIG. 14 is a top perspective view of the lid shown in FIG. 12, where the door is illustrated in the fully opened position.

The door 16 may have a first side 24 and a second side 26, and the first pad 22 may be secured to either the first side 24 or the second side 26 of the door 16, as desired. In certain examples, as shown in FIGS. 4, 8, and 11, the first pad 22 may be attached to the first side 24 of the door 16 and configured to support the user 3 while in the seated position where the door 16 is in the opened position 18. In other examples, as shown in FIG. 14, the first pad 22 may be attached to the second side 26 of the door 16 and configured to support the user 3 while in the seated position where the door 16 is in the opened position 18. In either case, it should be appreciated that the selective moving of the door 16 to the opened position 18 by the user allows the user 3 to access the contents of the bucket 4 through the opening 14 while also seated on the combination seat and bucket lid 2.

In further embodiments, as shown in FIGS. 1 and 4-8, the door 16 may have a grip tab 29 that facilitates the movement of the door 16 by the user 3. The grip tab 29 may extend outwardly from a primary body of the door 16. For example, the grip tab 29 may extend outwardly from a rim 30 of the door 16. In particular, the grip tab 29 may be disposed at a front portion of the rim 30 of the door 16, opposite a rear portion of the rim 30 of the door 16 that is movably attached to the main body 6 of the lid 2. Other locations and configurations for the grip tab 29 may also be selected, as desired.

Figure 1:
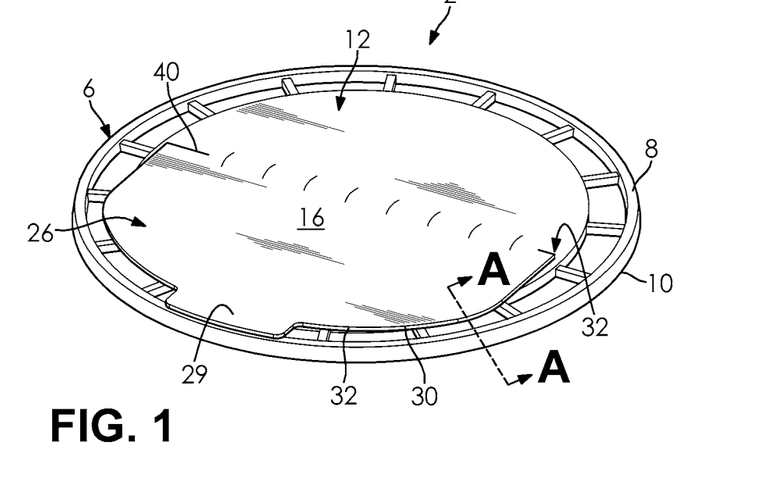
FIG. 1 is a top perspective view of a lid according to an embodiment of the present disclosure, and further showing a movable door in a closed position and covering an opening of the lid.
Figure 2:
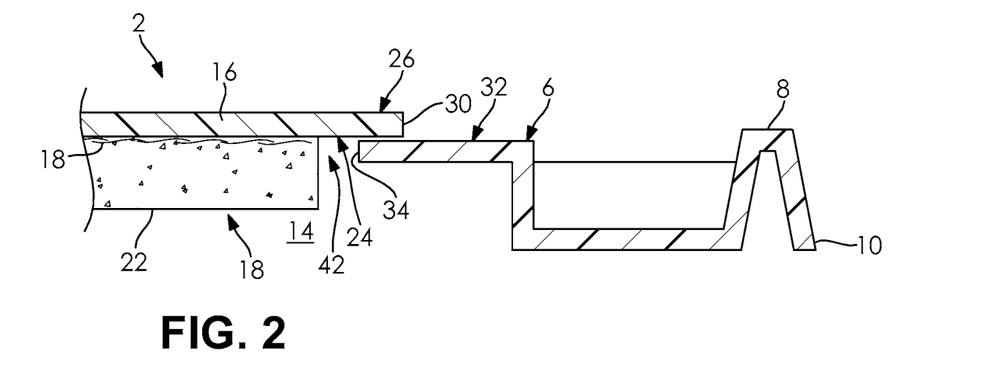
FIG. 2 is a fragmentary, cross-sectional, front elevational view of the lid taken at section line A-A in FIG. 1 according to one embodiment of the present disclosure, where a portion of the movable door abuts an upper surface of the lid adjacent the opening in the lid where the door is in the closed position.

In particular embodiments, as shown in FIG. 2, at least one of the first side 24 and the second side 26 of the door 16 may also have a surface area that is greater than an area of the opening 14. In particular, the greater surface area of the door 16 may result in the rim 30 of the door 16 extending laterally past an edge 34 of the opening 14, and in turn causing the rim 30 to rest upon an upper surface 32 of the main body 6 where the door 16 is in the closed position 20. It should also be appreciated that the relative arrangement of the rim 30 and the edge 34 of the opening 14 militates against the door 16 collapsing into an interior of the bucket 4 in operation.

Figure 3:
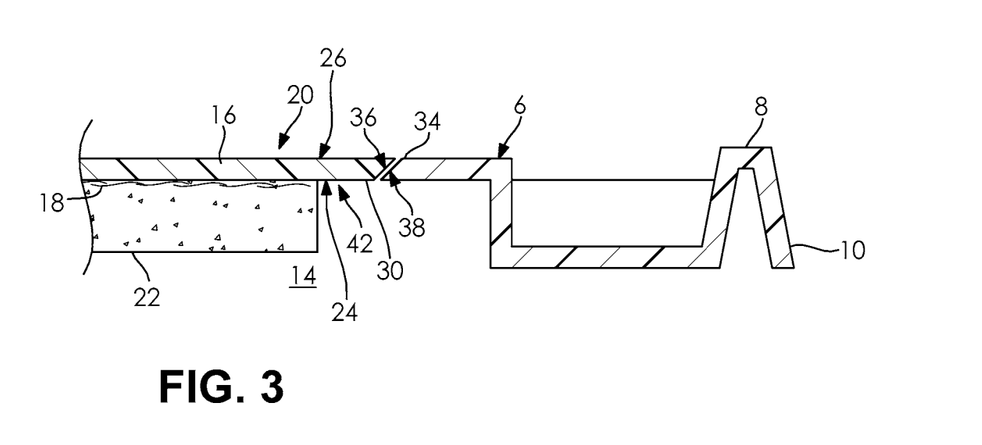
FIG. 3 is a fragmentary, cross-sectional, front elevational view of the lid taken at section line A-A in FIG. 1 according to another embodiment of the present disclosure, where an edge of the door is beveled and an edge of the lid defining the opening in the lid is beveled, and the beveled edges of the door and the opening of the lid abut where the door is in the closed position.

In further embodiments, as shown in FIG. 3, the edge 34 of the opening 14 and the rim 30 of the door 16 may each have complementary beveled surfaces 36, 38. The beveled surfaces 36, 38 of the rim 30 and the edge 34 also militate against the door 16 collapsing into the interior of the bucket 4 in operation. The beveled surfaces 36, 38 of the rim 30 and the edge 34 also allow the door 16 and the center area 12 of the main body 6 to be co-planar where the door 16 is in the closed position 20.

With reference to FIGS. 1-11, the door 16 may be movably attached to the lid 2 via a hinge 40. One skilled in the art may select any suitable type of the hinge 40, such as a living hinge (shown in FIGS. 1 and 4) and a butterfly hinge (shown in FIGS. 5 and 7-11), as non-limiting examples. The living hinge 40 may be a thin and flexible plastic that is co-formed with the lid 2 and the door 16, and which may be easily flexed to permit for the hinged movement of the door 16 in operation. The butterfly hinge 40 may be separately formed and affixed to each of the lid 2 and the door 16 with mechanical fasteners such as screws, bolts, or the like. Other suitable types of the hinge 40 are also contemplated and may be employed, as desired.

The door 16 is configured to alternate between the opened position 18 where the front portion of the rim 30 is hingedly rotated upwardly and away from the opening 14, and the closed position 20 where the front portion of the rim 30 is hingedly rotated downwardly and toward the opening 14. Where the first pad 22 is affixed to the first side 24 of the door 16, as shown in FIGS. 1-2, 5, and 9, the first pad 22 may be disposed in the opening 14 where the door 16 is hingedly rotated downwardly to the fully closed position 20. In such a configuration of the first pad 22, where the door 16 is hingedly rotated all the way to the fully opened position 18, as shown in FIGS. 4, 8, and 11, it should be appreciated that the second side 26 of the door 16 may then be disposed between the main body 6 of the lid 2 and the first pad 22.

With renewed reference to FIG. 2, a peripheral edge the first pad 22 may be spaced apart from an outermost edge of the rim 30 of the door 16 in order to fit within the opening 14, where the door 16 is hingedly rotated to the fully closed position 20. The spacing of the first pad 22 relative to the rim 30 of the door 16 defines a distance or gap area 42 of the door 16 between the peripheral edge of the first pad 22 and the outermost edge of the rim 30. The rim 30 of the door 16 may be adapted to abut the upper surface 32 of the main body 6 and cover the edge 34 of the opening 14 in the gap area 42. Likewise, a portion of the main body 6 adjacent the edge 34 of the opening 14 may abut the gap area 42 of the door 16 where the door 16 is in the closed position 20.

It should be appreciated that the first pad 22 is likewise configured to be disposed in the opening 14, where the door 16 is in the closed position 20. This configuration advantageously protects the first pad 22 from the environmental exposure and the elements where the door 16 is in the closed position 20. Additionally, the disposition of the first pad 22 within the interior of the bucket 4 where the door 16 is closed will provide the user 3 with a dry seat where the door 16 is subsequently opened, even if the lid 2 and bucket 4 have otherwise been exposed to a wet environment or conditions.

Figure 5:
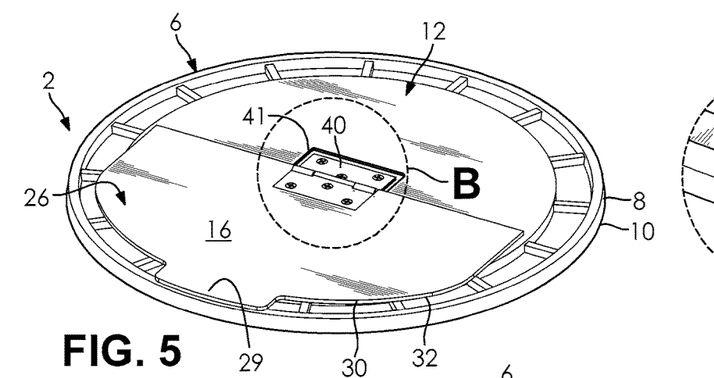
FIG. 5 is a top perspective view of a lid according to another embodiment of the present disclosure, and further showing a movable door attached to the lid with a butterfly hinge and in a closed position covering an opening of the lid.
Figure 7:
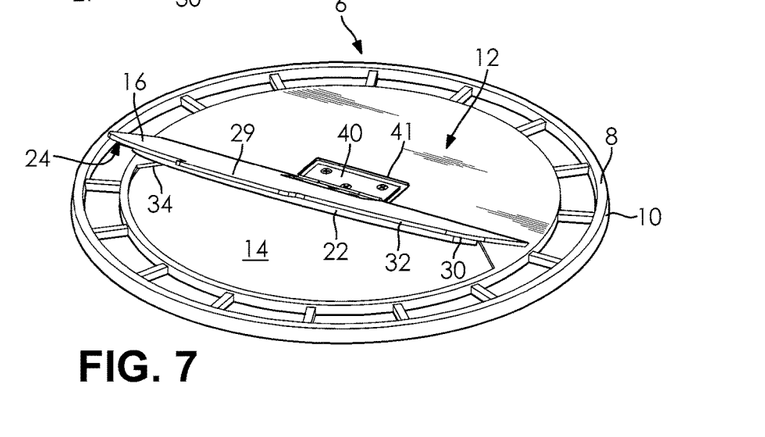
FIG. 7 is a top perspective view of the lid shown in FIG. 5, where the door is further illustrated elevated between the opened position and the closed position.

As shown in FIGS. 5 and 7-8, and in particular embodiments, the lid 2 may have a recess 41 that is formed in the center area 12 of the main body 6. The hinge 40 may be disposed within the recess 41 and attached to the center area 12 of the lid 2 at the recess 41. It should be appreciated that the disposing of the hinge 40 in the recess 41 may allow the door 16 to be oriented more parallel with the center area 12 of the lid 2 where the door 16 is in the closed position 20. This arrangement likewise permits for the provision of a more level seat for the user 3 where the lid 2 is in the opened position 18.

Figure 6:
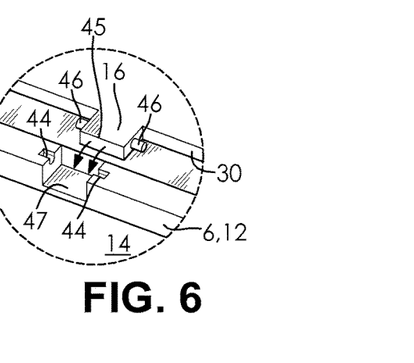
FIG. 6 is an enlarged, fragmentary, exploded, top perspective view of a hinge according to yet another embodiment of the present disclosure and taken at call-out B in FIG. 5, the hinge formed by cooperation of integrally molded portions of the lid and the door.

With reference to FIG. 6, and in alternative embodiments, the hinge 40 may be an integral hinge 40 defined by an integrally molded hinge portion of at least one of the main body 6 of the lid 2 and the door 16. For example, the main body 6 of the lid 2 may have at least one indentation 44 formed therein, which is configured to receive at least one hinge rod 46 of the door 16. The cooperation of the at least one indentation 44 with the at least one hinge rod 46 permits for a hinge-like attachment of the door 16 to the main body 6 of the lid 2. The at least one indentation 44 and the at least one hinge rod 46 may also be sized and shaped appropriate to provide a snap or friction-fit that permits the door 116 to be hingedly moved but otherwise secures the door 16 to the main body 6 of the lid 2.

The at least one hinge rod 46 may also be oriented substantially parallel with the rear edge of the rim 30 the door 16. In a particular embodiment, shown in FIG. 6, the door 16 may have two hinge rods 46 disposed on a hinge rod body 45 connected to the door 16, which are configured to be received by two indentations 44, where the indentations 44 are disposed on opposite sides of an aperture 47 formed in the main body 6 of the lid 2. Other integrally molded structures for forming the hinge 40 may also be selected by a skilled artisan within the scope of the present disclosure.

In another embodiment (not shown), the door 16 and the opening 14 may be sized and shaped appropriately to provide a snap or friction-fit between the door 16 and the opening 14 of the lid 2, where the door 16 is in the closed position 20. Additionally, in a further embodiment, the edge 34 of the opening 14 may have a sealing bead (not shown) formed adjacent thereto. The sealing bead (not shown) may be configured to form a fluid-tight seal between the door 16 and the opening 14 of the lid 2 where the door 16 is in the closed position 20. For example, the sealing bead (not shown) may be provided by a ridge of a polymeric sealing material placed around at least one of the edge 34 of the opening 14 and the rim 30 of the door 16, in order to facilitate the formation of the fluid-tight seal in operation.

With reference to FIGS. 9-11, and 17-20, the lid 2 may be provided with at least one additional or second pad 48, which is configured to provide added comfort for the user 3 in the seated position. The second pad 48 may be formed from the same or different materials as the first pad 22, and may have the same or different thicknesses as the first pad 22, described hereinabove. The second pad 48 may also be affixed to the lid 2 with an adhesion layer (not shown), formed by the same or different chemical adhesives or mechanical fasteners as used for the first pad 22, also described hereinabove.

The second pad 48 may be disposed in the center area 12, between the opening 14 and the lip 8 of the main body 6. In certain embodiments, the second pad 48 may be disposed on a peripheral area 50 of the main body 6. The peripheral area 50 of the main body 6 may be located adjacent to the lip 8 and, more particularly, between the lip 8 and the center area 12 of the main body 6. The second pad 48 may also be absent from an area of the main body 6 where the second side 26 of the door 16 will normally abut the main body 6 where the door 16 is in the opened position 18. The abutting of the center area 12 of the main body 6 by the door 16 may allow an outer surface of the first pad 22 on the door 16 to be substantially coplanar with an exterior surface of the second 48 on the lid 2 where the door is in the fully opened position 18, for example, as shown in FIG. 11. It should be appreciated that the outer surface of the first pad 22 being substantially coplanar with the exterior surface on the second pad 48 may facilitate the formation of a more comfortable surface for the user 3 to sit upon, in operation.

In yet another embodiment, illustrated in FIGS. 12-15 and 17-22, the door 16 may be rotatably attached to main body 6 of the lid 2 about an axis of rotation (R) that is oriented transverse to a plane upon which the main body 6 of the lid 2 is disposed. In a particular embodiment, the axis of rotation (R) is orthogonal to the plane of the main body 6. The door 16 may cover the opening 14 in the closed position 20. The door 16 may be disposed below the main body 6 in the opened position 18.

As shown in FIGS. 14-15 and 17-22, the door 16 may be secured to the center area 12 of the lid 2 by a pivoting mechanical fastener 52. The mechanical fastener 52 may permit the door 16 to selectively pivot in relation to the main body 6. Non-limiting examples of the mechanical fastener 52 may include a screw, a bolt, a pin, a rivet, a swivel, a roto-hinge, a rotating fastener, a pivoting fastener, an integral hinge, or the like. The integral hinge may include at least one hinge rod of one of the main body 6 and the door 16 cooperating with at least one aperture of one of the main body 6 and the door 16. Other suitable fastening arrangements may be chosen by one skilled in the art, within the scope of the present disclosure. It should be appreciated that a skilled artisan may choose from any other type of suitable fasteners permitting a rotating movement while securing the door 16 to the lid 2, as desired.

Figure 15:
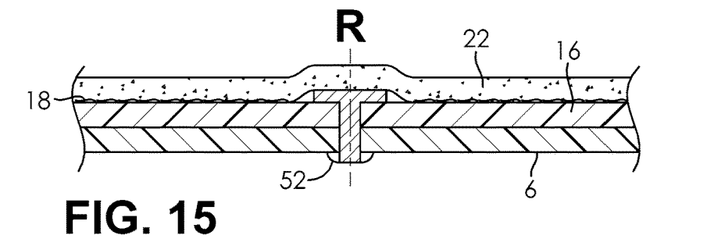
FIG. 15 is a fragmentary, cross-sectional, front elevational view of the lid taken at section line C-C in FIG. 12, and further illustrating a fastener for rotatably attaching the door to the lid.
Figure 16:
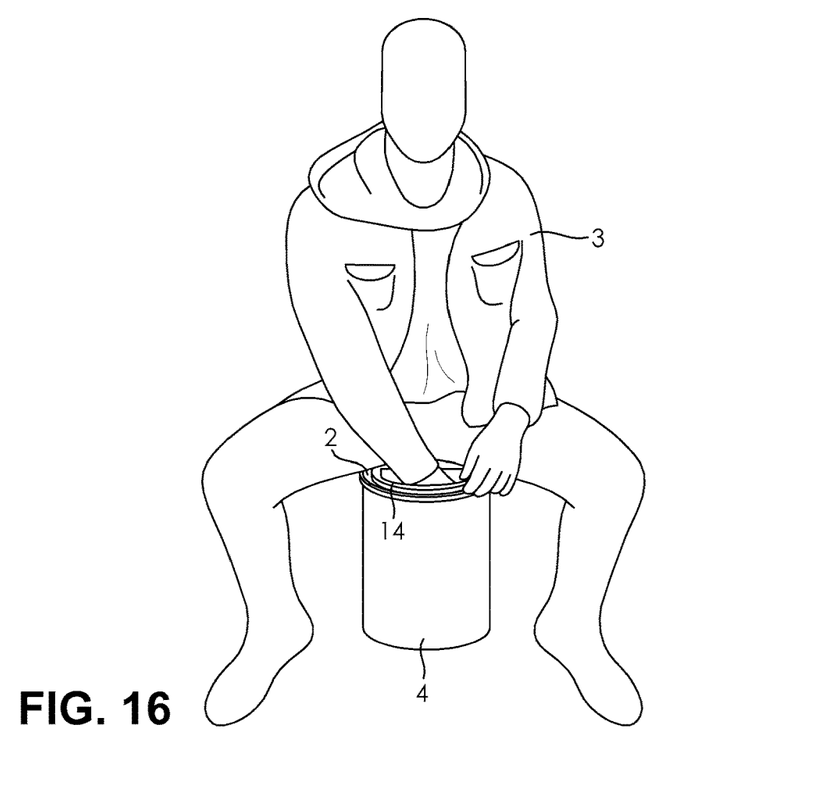
FIG. 16 is a top perspective view of a user sitting on the lid of the present disclosure, where the door is in the opened position, and the user is inserting a hand into the bucket to retrieve contents from the bucket.
Figure 17:
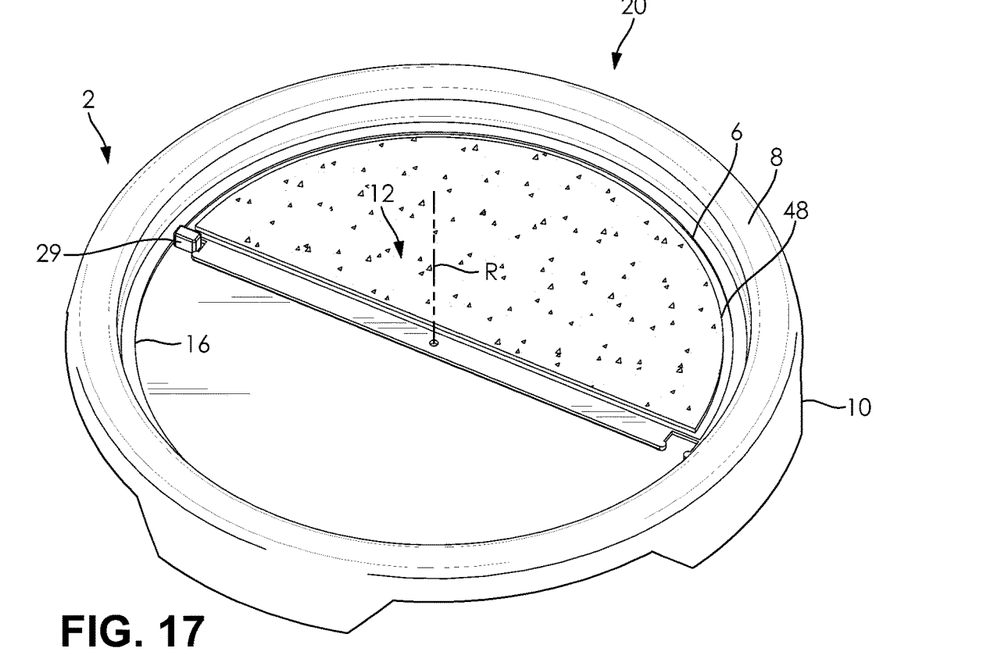
FIG. 17 is a top perspective view of the lid, further showing the lid in a closed position, according to an additional embodiment of the present disclosure.
Figure 18:
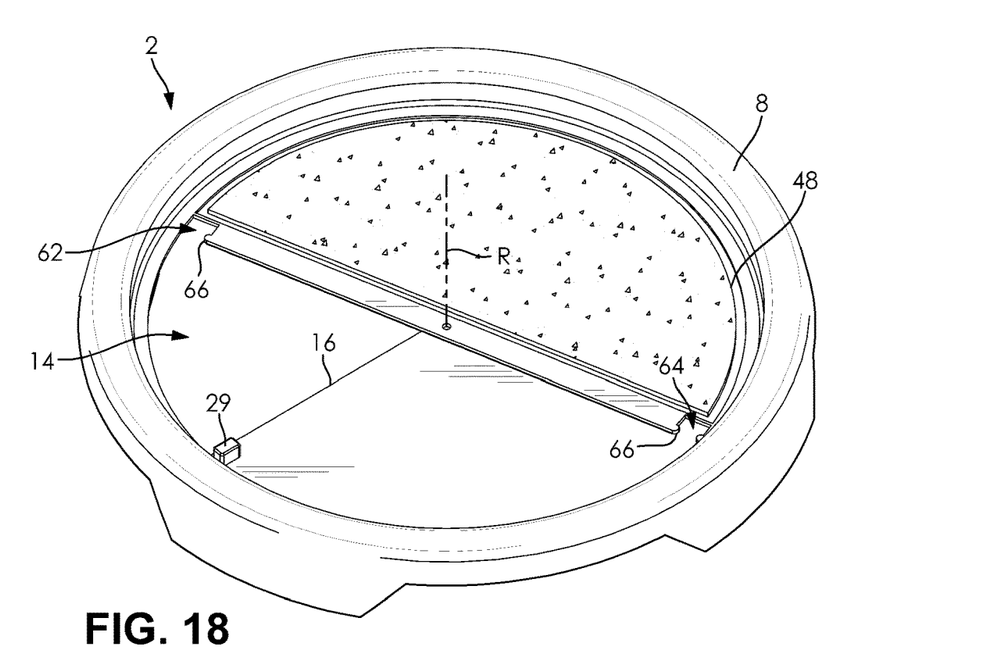
FIG. 18 is a top perspective view of the lid shown in FIG. 17, and showing the lid rotating from the closed position to an opened position.
Figure 19:
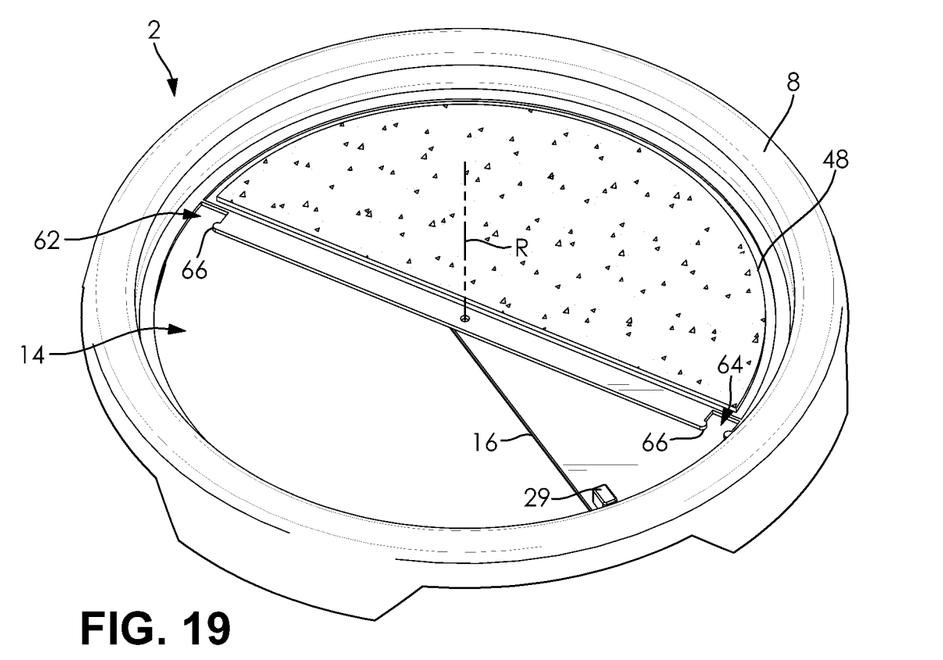
FIG. 19 is a top perspective view of the lid as shown in FIGS. 17-18, and showing the lid rotating further from the closed position to the opened position.
Figure 20:
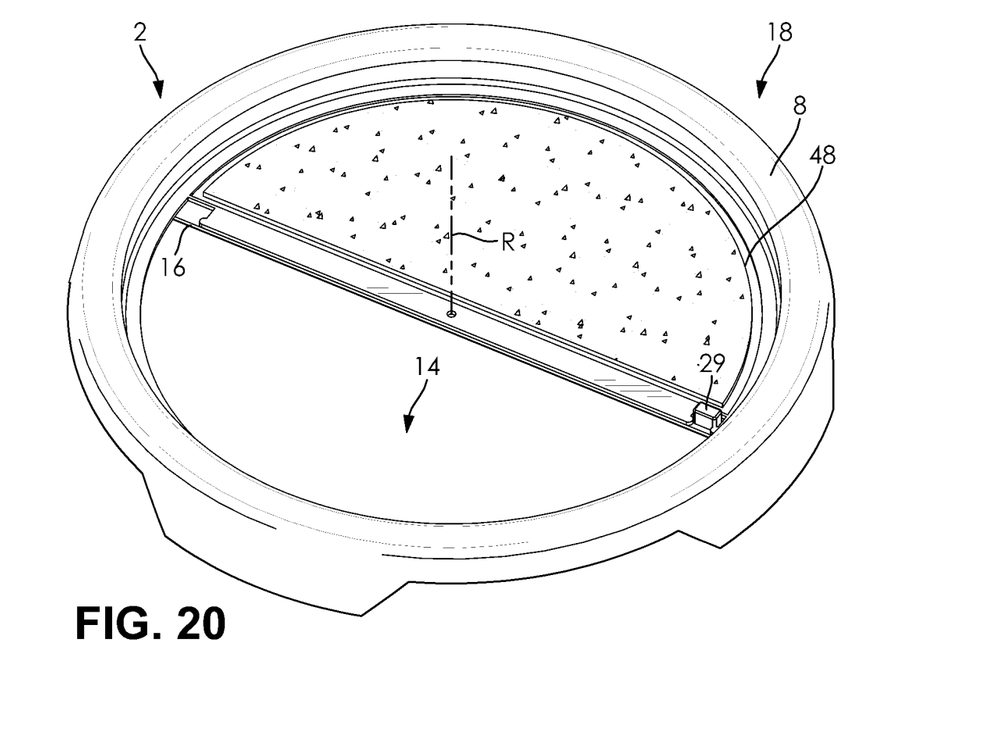
FIG. 20 is a top perspective view of the lid as shown in FIGS. 17-19, and further showing the lid in an open position.

With reference to FIG. 15, the fastener 52 may be disposed underneath the first pad 22, which advantageously militates against the fastener 52 causing the user 3 discomfort in the seated position. Advantageously, the fastener 52 allows the door 16 to rotate around axis of rotation (R) oriented traverse to the bucket lid 2, thereby allowing the user 3 to selectively cover and uncover the opening 14 by rotation of the lid to either the closed position 20 or the opened position 18, respectively. In particular, and in contrast to the hinged embodiment described hereinabove, the door 16 in this embodiment may be rotatable between the closed position 20, where the door 16 covers the opening 14, and the opened position 18, where the door 16 uncovers the opening 14.

With continued reference to FIGS. 12-15, the first pad 22 may be secured to the second side 26 of the door 16 where the door 16 is intended to be rotated to the closed and opened position 18 about the axis of rotation (R). The first side 24 of the door 16 may therefore be disposed between the main body 6 and the first pad 22 where the door 16 is in both the opened position 18 and the closed position 20.

Figure 12:
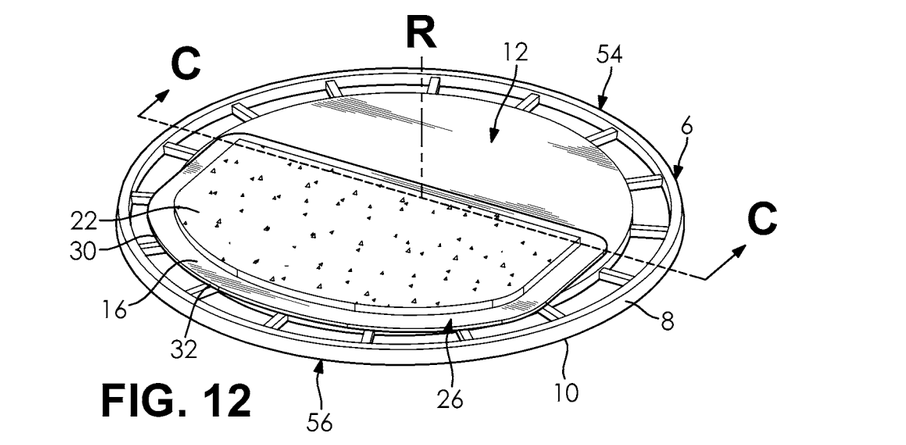
FIG. 12 is a top perspective view of a lid according to an additional embodiment of the present disclosure, and further showing a rotatable door in a closed position and covering an opening of the lid.

Furthermore, as illustrated in FIGS. 12 and 14, the door 16 may be adapted to be disposed within entirely within the outermost perimeter 10 of the lid 2 where the door 16 is in the closed position 20 (shown in FIG. 12), and also may be adapted to be disposed partly outside of the outermost perimeter 10 of the lid where the door 16 is in the opened position 18 (shown in FIG. 14).

Figure 13:
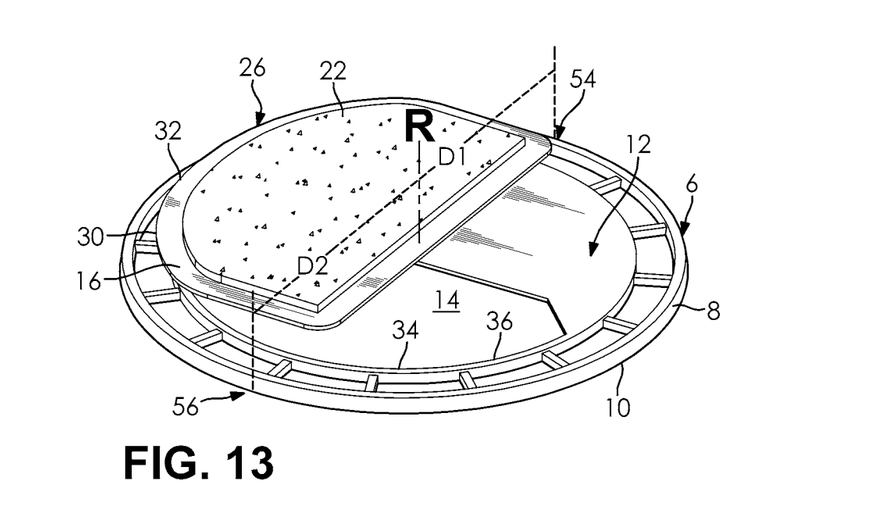
FIG. 13 is a top perspective view of the lid shown in FIG. 12, where the door is illustrated rotated between the closed position and the opened position.

With continued reference to FIGS. 12-15, and in particular embodiments, the lid 2 of the main body 6 may have a first end 54 and a second end 56. The door 16 may be secured closer to the first end 54 than the second end 56. For example, as shown in FIG. 13, a distance D1, as measured from the axis of rotation (R) to the first end 54 of the lid 2, may be less than a distance D2, as measured from the axis of rotation (R) to the second end 56 of the lid 2. It should be appreciated that, where the door 16 is secured at the axis of rotation (R) being offset from an exact center of the lid 2, the door 16 may fit within the perimeter 10 of the lid 2 in the closed position 20 (shown in FIG. 12), but a portion of the door 16 will be outside of the outermost perimeter 10 of the lid 2 in the opened position 18 (shown in FIG. 14). Advantageously, this allows the first pad 22 to have a larger surface area than it might otherwise be able to have, which in turn provides a greater comfort to the user 3 in the seated position.

In operation, the user 3 may first attach the lid 2 to the bucket 4. In the embodiments shown in FIGS. 1-15, the user 3 may then move the door 16, either hingedly or by rotation about the axis of rotation (R), from the closed position 20 to the opened position 18 before sitting upon the lid 2. This allows the user 3 to access the contents of the bucket 4 while subsequently seated on at least one of the first pad 22 and the second pad 48. After the user 3 is finished using the bucket 4 as a seat, the user 3 may stand up from the bucket 4 and move the door 16 to the closed position 20. In the closed position 20, the door 16 operates to cover or seal the opening 14 in the lid 2 and protect the contents of the bucket 4 from the surrounding environment.

In a most particular example, the combination seat and bucket lid 2 of the present disclosure is used in the context of a baseball practice or game, where the most coveted seat in any dugout is the baseball bucket 4. The opening 14 in the bucket lid 2 therefore allows the user 3 such as a player or coach to access baseballs in the bucket 4 without the hassle of having to stand up and remove the lid 2 each time a ball is to be retrieved from the bucket 4. Other uses for the lid 2 are also contemplated and may include, as non-limiting examples, hunting, fishing, camping, chlorine tablet storage for pools, gardening purposes, construction, and other sports or athletic events.

Figure 21:
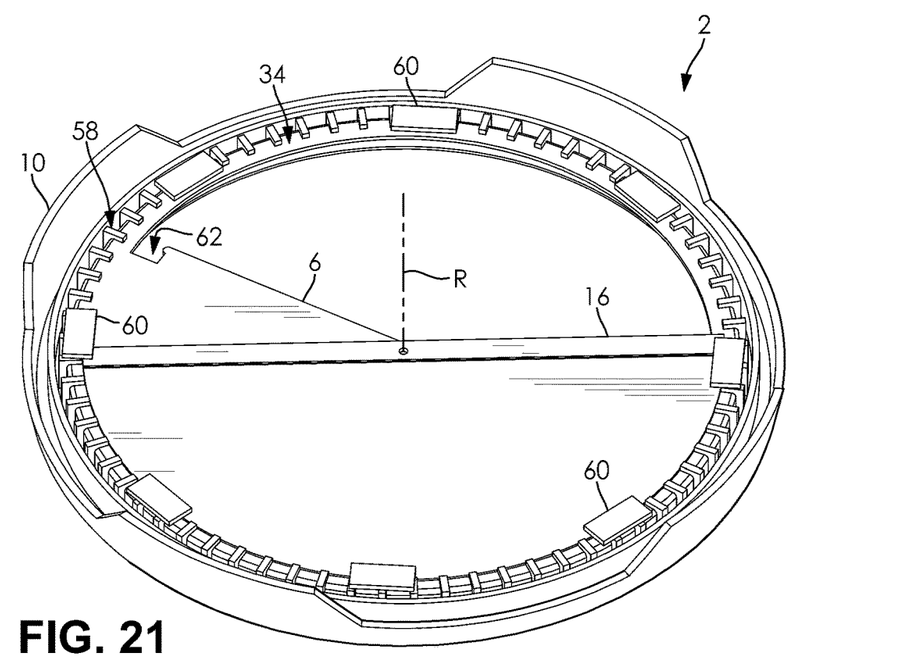
FIG. 21 is a bottom perspective view of the lid as shown in FIGS. 17-20, and further showing a support in the form of tabs.
Figure 22:
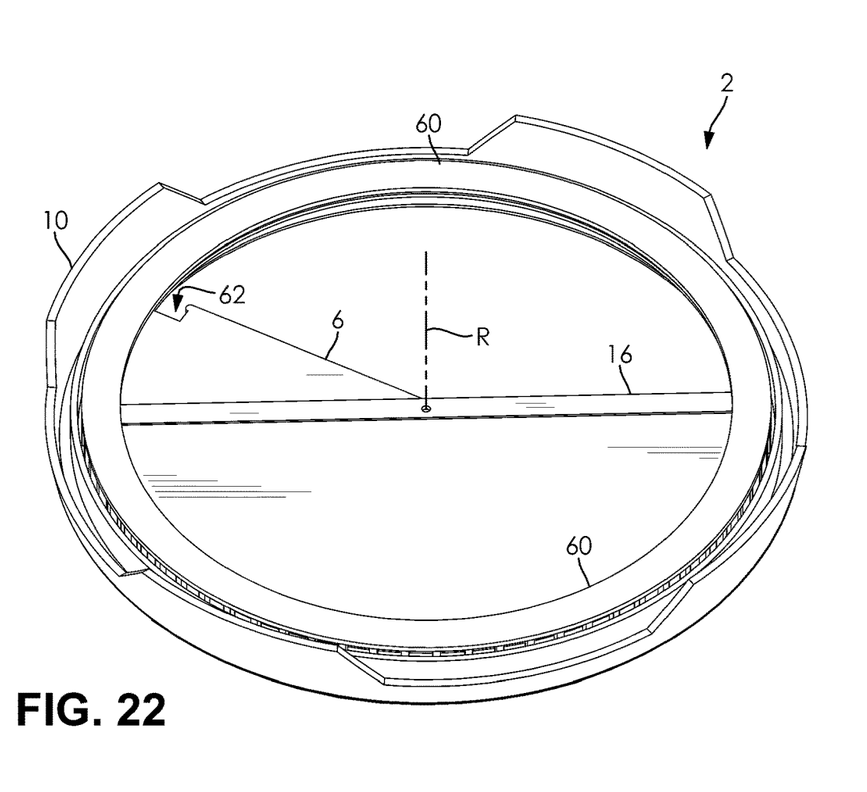
FIG. 22 is a bottom perspective view of the lid, further showing a support in the form of a continuous annular flange, according to an additional embodiment of the present disclosure.

In yet another embodiment, as shown in FIGS. 21-22, the door 16 may be configured to overlap an underside of the edge 34 of the opening 14, thereby sealing the opening 14 in the closed position 20. In other words, the first side 24 of the door may define a first area. The edge 34 of the opening 14 may define a second area. The first area may be greater in size than the second area. A bottom surface 58 of the main body 6 may also have a support 60. The support 60 may be configured to accept the rim of the door 30. In a specific example, the support 60 may be a plurality of supporting tabs. In an alternative example, the support 60 may be a continuous rail. Advantageously, the support 60 enhances the structural integrity of the bucket lid 2.

In a particular embodiment, as shown in FIGS. 17-20, the door 16 and the main body 6 have a way of selectively disposing the door 16 in either the opened position 18 or the closed position 20. In a more particular embodiment, the grip tab 29 of the door 16 extends outwardly and is disposed near the rim 30 of the door 16. The center area 12 may have a first recess 62 that configured to accept the grip tab 29 when in the closed position 20. The center area 12 may further have a second recess 64 configured to accept the grip tab 29 when in the open position. Each of the first recess 62 and the second recess 64 may have a protrusion 66. Each protrusion 66 may be configured to selectively retain the grip tab 29 in at least one of the open position and the closed position 20. Each protrusion 66 may selectively retain the grip tab 29 using a friction fit.

In a specific example, with continued reference to FIGS. 17-20, the center area 12 may be covered with the second pad 48. In another specific example, the first side 24 of the door 16 may be covered with the first pad 22. In a more specific example, the first pad 22 may be configured to be disposed entirely within the opening 14 where the door 16 is in the closed position 20. Advantageously, each of the first pad 22 and the second pad 48 may be configured to provide a cushioning feature to the bucket lid 2. One skilled in the art may select other suitable products and materials to form the cushioning feature of the bucket lid 2, within the scope of the present disclosure.

Figure 23:
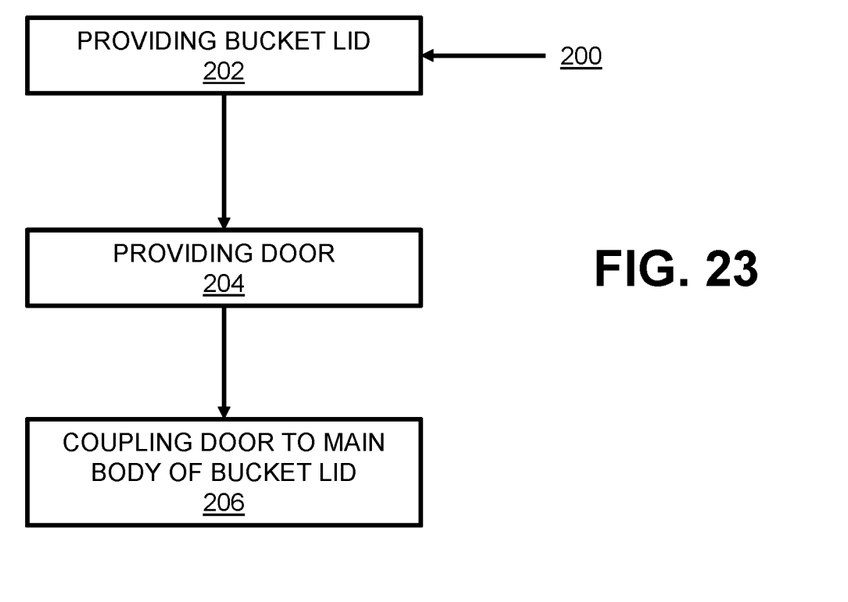
FIG. 23 is a flowchart of a method for constructing the combination seat and bucket lid, according to another embodiment of the present disclosure.

In a further embodiment, as shown in FIG. 23, the combination seat and bucket lid 100 may include a method 200. The method 200 may include a step 202 of providing the bucket lid 2 having the main body 6 with the center area 12 and the opening 14 formed adjacent the center area 12. The method 200 may include another step 204 of providing the door 16 configured to be movably attached to the main body 6, the door 16 configured to be selectively movable between the opened position 18 and the closed position 20, the door 16 configured to cover the opening 14 in the closed position 20, and the door 16 further configured to be disposed below the center area 12 of the main body 6 in the opened position 18. The method 200 may further include a step 206 of coupling the door 16 to the main body 6.

Advantageously, the combination seat and bucket lid 2 of the present disclosure allows the user to access the contents of the bucket 4, while remaining in a seated position. The combination seat and bucket lid 2 also provides superior comfort for the user 3 relative to conventional unpadded bucket lids known in the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. A combination seat and bucket lid configured for coupling to a bucket, comprising:
    a main body including a lip configured to couple the lid to the bucket, a bottom surface of the lid facing the bucket when coupled thereto, and a center area and an opening formed adjacent the center area; and
    a door selectively movably attached to the main body by a pivoting fastener, the door selectively movable between an opened position and a closed position, the door covering the opening in the closed position, and the door disposed below the center area of the main body in the opened position,
    wherein the pivoting fastener includes one of a swivel, a roto-hinge, a rotating fastener, a pin, a bolt, a screw, a rivet, and an integral hinge including at least one hinge rod of one of the main body and the door cooperating with at least one aperture of one of the main body and the door.

2. The combination seat and bucket lid of claim 1, wherein the pivoting fastener comprises the integral hinge, the center area is circumscribed by a lip of the main body, and the integral hinge is affixed to main body at the center area of the main body.

3. The combination seat and bucket lid of claim 1, wherein the center area has a second pad.

4. A bucket including the combination seat and bucket lid of claim 1.

5. A combination seat and bucket lid configured for coupling to a bucket, comprising:
    a main body including a lip configured to couple the lid to the bucket, a bottom surface of the lid facing the bucket when coupled thereto, and a center area and an opening formed adjacent the center area; and
    a door movably attached to the main body, the door selectively movable between an opened position and a closed position, the door covering the opening in the closed position, and the door disposed below the center area of the main body in the opened position,
    wherein the door is continuously selectively movable between the opened position and the closed position so that the door can fully cover the opening in the closed position, not cover the opening in the open position, and can at least partially cover the opening in any intermediate position therebetween,
    wherein the main body has an edge surrounding the opening, and the door is configured to overlap an underside of the edge surrounding the opening in the closed position.

6. The combination seat and bucket lid of claim 5, further comprising a support on a bottom surface of the main body, the support configured to accept a rim of the door.

7. The combination seat and bucket lid of claim 6, wherein the support includes a plurality of supporting tabs.

8. The combination seat and bucket lid of claim 6, wherein the support includes a continuous rail.

9. The combination seat and bucket lid of claim 5, wherein the door defines a first area, and the edge of the opening defines a second area, and the first area is larger than the second area.

10. A combination seat and bucket lid configured for coupling to a bucket, comprising:
    a main body including a lip configured to couple the lid to the bucket, a bottom surface of the lid facing the bucket when coupled thereto, and a center area and an opening formed adjacent the center area; and
    a door movably attached to the main body, the door selectively movable between an opened position and a closed position, the door covering the opening in the closed position, the door disposed below the center area of the main body in the opened position, and the door having a grip tab extending outwardly and disposed proximate a rim of the door,
    wherein the center area has a first recess, the first recess configured to accept the grip tab when the door is in the closed position.

11. The combination seat and bucket lid of claim 10, wherein the center area has a second recess, the second recess configured to accept the grip tab when the door is in the open position.

12. The combination seat and bucket lid of claim 11, wherein the first recess and the second recess are disposed on substantially opposite sides of the lid.

13. The combination seat and bucket lid of claim 11, wherein each of the first recess and the second recess includes a protrusion configured to selectively retain the grip tab when the door is respectively in one of the open position and the closed position.

14. A combination seat and bucket lid configured for coupling to a bucket, comprising:
- a main body including a lip configured to couple the lid to the bucket, a bottom surface of the lid facing the bucket when coupled thereto, and a center area and an opening formed adjacent the center area; and
- a door movably attached to the main body, the door selectively movable between an opened position and a closed position, the door covering the opening in the closed position, the door disposed below the center area of the main body in the opened position, and the door is movably attached to the main body about an axis of rotation that is oriented substantially perpendicular to a plane on which the main body is disposed, wherein the axis of rotation is defined by a pivot joint.

15. A method for constructing a combination seat and bucket lid, the method comprising the steps of:
- providing a bucket lid having a main body including a lip configured to couple the lid to the bucket, a bottom surface of the lid facing the bucket when coupled thereto, and a center area and an opening formed adjacent the center area;
- providing a door configured to be selectively movably attached to the main body by a pivoting fastener, the door configured to be selectively movable between an opened position and a closed position, the door covering the opening in the closed position, and the door disposed below the center area of the main body in the opened position, wherein the pivoting fastener includes one of a swivel, a roto-hinge, a rotating fastener, a pin, a bolt, a screw, a rivet, and an integral hinge including at least one hinge rod of one of the main body and the door cooperating with at least one aperture of one of the main body and the door; and
- coupling the door to the main body.

* * * * *